Aug. 26, 1969      K. W. KLEIN      3,463,967
PANELBOARD LOAD CENTER
Filed Dec. 24, 1964      2 Sheets-Sheet 1
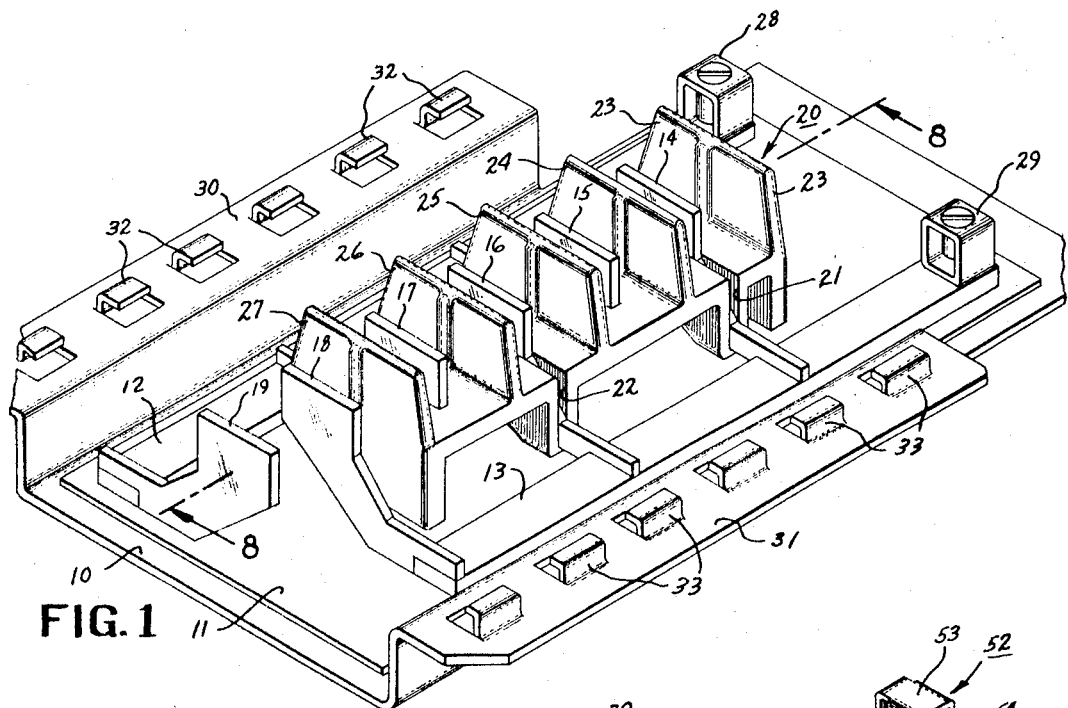
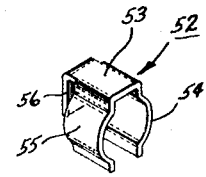
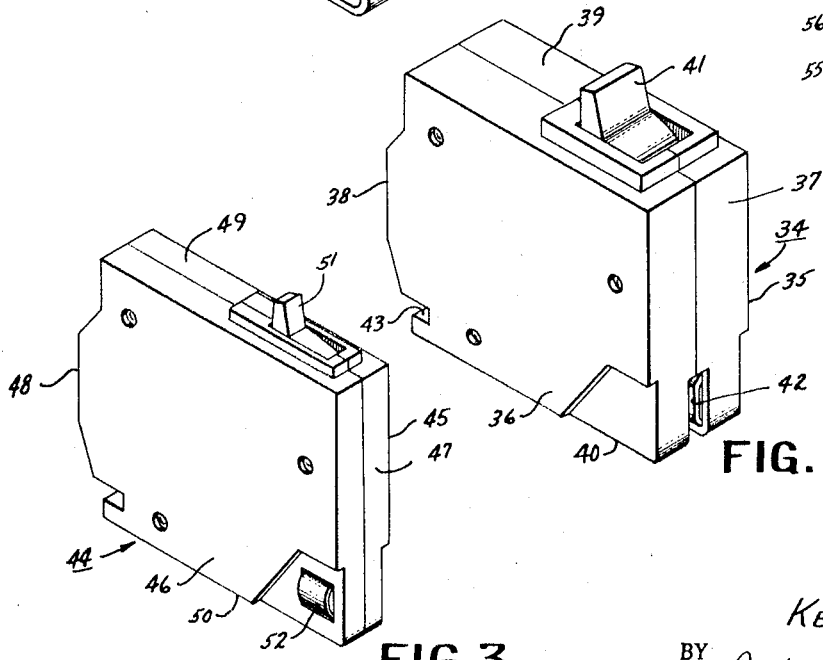
INVENTOR.
KEITH W. KLEIN
BY Robert A. Casey
ATTORNEY INVENTOR
KEITH W. KLEIN
BY Robert G. Casey
ATTORNEY United States Patent Office 3,463,967
Patented Aug. 26, 1969

3,463,967
PANELBOARD LOAD CENTER
Keith W. Klein, Simsbury, Conn., assignor to General
Electric Company, a corporation of New York
Filed Dec. 24, 1964, Ser. No. 420,876
Int. Cl. H02b 1/02, 11/02
U.S. Cl. 317—119                                8 Claims This invention relates to electrical control panelboard assemblies and load centers which are adapted and designated to receive circuit breakers or functionally analogous units by plug-in engagement of cooperating electrical contacts and particularly such panel board assemblies and load centers which are designed to receive circuit breakers of modularly related widths.

Panelboard and load centers of the type referred to may be connected to different sources of electrical energy through bus bars or similar appropriate means and thus individual modular circuit breaker units may be connected to different sources of electrical energy in side-by-side relationship. Accordingly a wide variety of combinations of phase of electrical source, ampere rating of individual circuit breaker units and modular sizes are conceivable and may be selectively desirable in various combinations for particular applications.

It is an object of the present invention to provide a panelboard load center wherein selected portions of the panelboard may be segregated to receive only circuit breakers of a particular modular size.

Another object of the present invention is to provide a panlboard for connection to different electrical sources and adapted to receive circuit breaker assemblies comprised of modular sized circuit breakers adaptable to multipole connection.

It is a further object of the present invention to provide a panelboard and circuit breakers adapted for connection therewith which may be assembled as two one-half module size circuit breakers to provide a two-pole circuit breaker assembly for connection to adjacent electrical contacts supplied by different sources of electrical energy.

A further object of the present invention is to provide an electric circuit breaker panelboard and circuit breakers adapted to be combined in an assembly of one full module size circuit breaker and two one-half module size circuit breakers for connection to adjacent electrical contacts as a three-pole two full module circuit breaker.

Another object of the present invention is to provide an electric breaker panelboard and circuit breakers to be mounted in engagement with such panelboard which afford mutual electrical connection in a broad variety of selectable combinations as to aggregate ampere rating of circuit breaker assemblies, phase, and modular size in single and multipole usages.

In accordance with the invention in one form there is provided a panelboard load center having a generally planar base and supporting a plurality of electrical blade contacts in insulated relation to the base. The blade contacts are arranged to extend generally normal to the plane of the base and are disposed on the central portion of the panelboard in parallel relationship spaced substantially one full module width apart. Such a panelboard load center is adapted and designed to receive circuit breakers of the type which is enclosed in an insulating casing having a generally rectangular shape and side walls of substantially the same dimensions, the sizes of such circuit breakers varying modularly as to width. An insulating block is arranged and disposed to surround the lower portions of at least some of the blade contacts and support those contacts against transverse displacement. The insulating block also provides a plurality of upstanding portions which are arranged in parallel alignment with the contact blades and disposed between such adjacent contact blades at substantially one-half modular width spacing therefrom. Thus, the invention in one form comprises an assembly which includes upstanding, parallel, centrally aligned contact blades spaced apart by substantially the width of a full module size circuit breaker and an insulating block supporting such blades against transverse displacement and having upstanding partition-like portions spaced one full module width apart and interposed between adjacent contact blades and equally spaced from such adjacent contact blades. In one form the panelboard load center of the present invention may have an insulating block as described hereinbefore and comprised of cast material molded about the assembly of the contact blades and the bus bars which support the contact blade so that the panelboard load center assembly is a structurally unitized assembly which may be supported in its entirety upon the panelboard base. The circuit breakers of the present invention are particularly designed and adapted to be received in electrical contact and engagement with the panelboard previously described and include a full module size circuit breaker having a pair of resilient contact jaws or similar suitable contact means disposed centrally within its insulating casing and near the corner of the bottom wall of the insulating casing thus being adapted to receive one of the upstanding parallel blade members therebetween. The one-half module size circuit breakers of the present invention are provided with an electrical contact means at or near the lower corner of both its side walls which electrical contact means are resiliently supported and adapted to be inserted into the panelboard between an upstanding portion of the insulating block and an adjacent contact blade member so as to slidingly and electrically engage one of its contacts with a blade contact member. The module size circuit breakers of the present invention may be combined into multipole assemblies such as a two pole circuit breaker assembly comprising two one-half module size circuit breaker units or a three pole circuit breaker assembly comprising one full module size circuit breaker unit and two one-half module size circuit breaker units. In accordance with another aspect of the present invention the insulating block and its upstanding portions may surround and support only certain of a plurality of adjacent contact blades, therefore providing a means by which segregation of a portion of the panelboard may be achieved in that only full module size circuit breakers are connectable into electrical engagement with the blade contacts in that portion of the panelboard which does not have upstanding adjacent portions of the insulating block surrounding blade contact members.

These and other aspects and objects of the present invention will be more fully understood from the following detailed description together with the accompanying drawings and its scope will be pointed out in the appended claims.

In the drawings:

FIGURE 1 is a perspective view of a panelboard load center of the present invention adapted and designed to receive circuit breakers of full module width and one-half module width;

FIGURE 2 is a perspective view of a full module width circuit breaker as conceived by the present invention;

FIGURE 3 is a perspective view of a one-half module width circuit breaker;

FIGURE 4 is a perspective view of one form of contact member of the half module size circuit breaker of the present invention;

Figure 8:
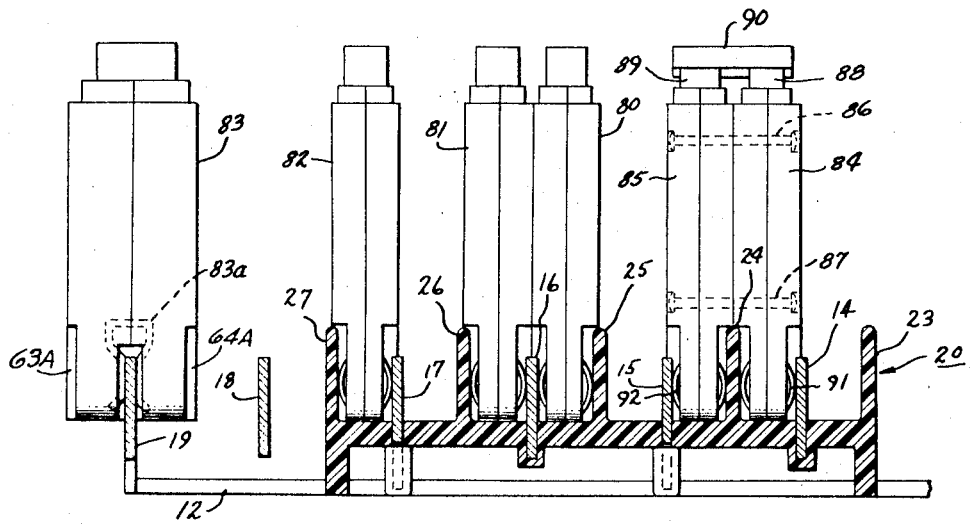
FIGURE 8 is a partially cross-sectional end view of circuit breakers of one-half module and full module sizes in engagement with portions of the panel board load center viewed through section 8—8 of FIGURE 1.

Referring now to FIGURE 1 there is shown a panel board load center of the present invention which comprises a generally planar base 10 supporting a sheet of suitable insulating material 11. Arranged on the base 10 of the panel board in insulation therefrom are two parallel bus bars 12 and 13 which in turn support a plurality of blade type contacts 14, 15, 16, 17, 18 and 19. It will be noted that the blade contacts 14, 16 and 18 are electrically connected to and supported by the bus bar 13 while the blade contacts 15, 17 and 19 are in electrical connection with and supported by the bus bar 12. An insulating block shown generally at 20 has a number of slots therein such as shown at 21 and 22 which are positioned and adapted to receive therein the contact blade members 14 and 16 respectively. Comparable slots in the insulating block 20 are positioned on its opposite side to receive the blade contacts 15 and 17. The centrally disposed parallel blade contact members 14, 15, 16, 17, 18 and 19 are equally spaced apart substantially by the width of a full module circuit breaker so as to receive in engagement circuit breakers of a full module width size and of a one-half module width size as conceived by the present invention and in a manner which will be explained more fully hereinafter. The insulating block 20 also has upstanding portions as shown at 23, 24, 25, 26 and 27 which are arranged on the central portion of the panel board in parallel alignment with plurality of contact blade members 14, 15, 16, 17, 18 and 19. The panel board load center of FIGURE 1 also includes appropriate electrical connector means 28 and 29 for electrically connecting a source of electrical energy to each of the bus bars 12 and 13, respectively. The panel board base 10 has as an integral part thereof a flange on either side as shown at 30 and 31 and as may be seen on the upper portion of each of the flanges 30 and 31, there are a plurality of bent-up, hook-like projections as indicated at 32 and 33 for the purpose of receiving an extending lug portion of the insulating casing of a circuit breaker as conceived by the present invention whereby the circuit breaker is then rotated about that point of engagement into electrical contact between the blade contact of the panel board and the contact means of the circuit breaker.

Referring to FIGURE 2, there is shown a perspective view of a circuit breaker as conceived by the invention and being of the larger modular size which in typical circuit breakers in present general use may be of a nominal one inch width. It will be noted that the circuit breaker in FIGURE 2 has an insulating casing shown generally at 34 which is substantially rectangular in shape and comprises two side walls 35 and 36 of substantially the same dimensions and end walls 37 and 38 as well as a top wall 39 and a bottom wall 40. Extending through the top wall of the insulating casing 34 of the circuit breaker of FIGURE 2 is an external, reciprocably operable handle member 41. Included within the insulating casing 34 near the end of its bottom wall 40 is a suitable electrical contact means 42 which may comprise a pair of electrically conductive resilient opposed jaws. Thus the circuit breaker of the larger modular size illustrated in FIGURE 2 is engageable with one of the blade contacts of the panel board of FIGURE 1 by insertion of a lug 43 extending from the corner of one of its bottom walls and rotation of the circuit breaker about that point of engagement with a retaining member such as those shown at 32, 33 until the circuit breaker electrical contact member 42 comes into engagement with one of the blade contact members of the panel board by slidingly receiving such a blade contact member therebetween in electrical connection.

The illustration of FIGURE 3 shows a circuit breaker of the smaller modular size which typically may be of nominally one-half inch width. It will be seen that the circuit breaker of FIGURE 3 comprises an insulating casing indicated generally at 44 and having side walls 45 and 46 of substantially the same dimensions, end walls 47 and 48, a top wall 49, and a bottom wall 50. Extending through the top wall 49 of the generally rectangularly shaped circuit breaker of FIGURE 3, there is an external handle member which is reciprocally operable from an "on" to an "off" position in the manner conventionally employed in circuit breakers of this type. Near the corner of the insulating casing formed by the end wall 47 and the bottom wall 50, there is a spring means comprising a resilient or spring type electrical contact 52. The construction of contact member 52 is shown more clearly in the enlarged detailed view of FIGURE 4 wherein it is seen that the contact member 52 comprises a rectangular upper portion 53 with depending, opposing cylindrically shaped portions 54 and 55 of resilient, electrically conductive material adapted to slidingly engage an electrically energized panel board blade member with positive electrical contact due to the outwardly spring-biased effect of the resiliency of the material when inserted between a blade contact and an adjacent upstanding portion of the panel board insulating block as seen in FIGURE 1. Also depending from the rectangular top portion 53 is a bent over portion 56 which may have an aperture therein to receive means for electrical connection with the internal mechanism of the circuit breaker and support of the contact itself 52. The contact means of the smaller modular size circuit breaker of the present invention may take several forms however, another of which will be disclosed and described hereinafter.

Figure 5:
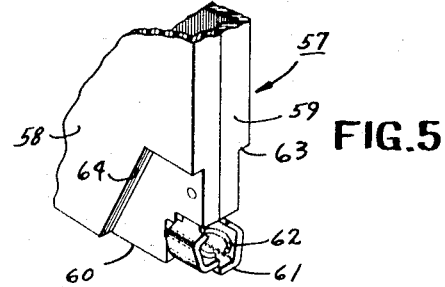
FIGURE 5 is a perspective partial view of a circuit breaker of the one-half module size illustrating a variant form of contact member.
Figure 6:
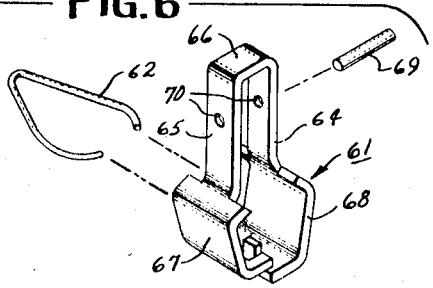
FIGURE 6 is an enlarged, exploded, perspective view of the contact member of the circuit breaker of FIGURE 5.

FIGURE 5 illustrates a variant type of contact member for use with the smaller modular size circuit breaker of the present invention. Shown in partial perspective view is a circuit breaker indicated generally at 57 which comprises an insulating casing 58 having an end wall 59 and a bottom wall 60. Near the bottom wall 60 is a contact means 61 which operates in a manner similar to that previously described in conjunction with the contact means of FIGURES 2, 3 and 4 but of a different configuration and including separate spring bias means shown at 62. It will be observed, however, that the contact means 61, taken as a whole, like the contact 52 of FIGURE 4 is a resilient spring means acting transversely of the breaker casing. It will be noted that the insulating casing of the circuit breaker 57 is recessed on either side of the corner formed by its bottom wall 60 and its end wall 59 as shown generally at 63 and 64. The configuration and functional aspects of the circuit breaker contact means 61 may be seen more clearly in the enlarged, detailed, exploded, perspective view of FIGURE 6 wherein in like members bear the same numerical designations as in FIGURE 5. The contact means 61 is formed preferably of resilient material of excellent electrical conducting properties and comprises two folded arms 64 and 65 arranged opposite each other and depending from central upper portion 66. The arms 64 and 65 have enlarged lower portions 68 and 67, respectively, which are preferably inwardly inclined to slidingly engage an electrical contact member. A resilient spring member 62, shaped with inclined portions of a generally modified V configuration as shown in FIGURE 6, is positioned between the lower enlarged contact portions 67 and 68 to spring bias those contact portions outwardly and assure good electrical contact with an adjacent blade member. The contact member assembly 61 is supported within the insulating casing of the circuit breaker by a pin member 69 inserted through aligned holes 70 in the upper arm portions 64 and 65. When assembled with a circuit breaker of the smaller modular size of the present invention, the contact means 61 of FIGURES 5 and 6 engages a blade contact member of a panelboard load center in the manner shown in FIGURE 7.

Figure 7:
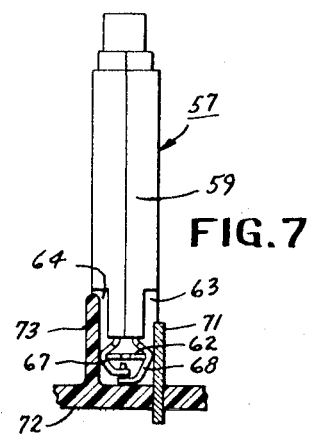
FIGURE 7 is a partially cross-sectional end view of a circuit breaker of one-half module size including a contact member of the type illustrated in FIGURES 5 and 6 shown in engagement with a portion of a panel board load center of the type illustrated in FIGURE 1.

FIGURE 7 is a partially cross-sectional end view of a smaller modular size circuit breaker 57 having a spring biased contact means shown generally at 61 in electrical engagement with the panelboard load center blade contact 71. It will be noted that the blade contact 71 is surrounded and supported by an insulating block 72 having an upstanding portion 73 which is arranged in parallel disposition to the blade contact 71 and spaced nominally one-half module width therefrom. When the smaller modular size circuit breaker as shown in FIGURE 7 and configured as conceived by the present invention, is engaged in electrical contact in the panelboard arrangement of the present invention, the two opposed lower resiliently spring biased contact arm portions 67 and 68 are inserted slidingly between the parallel and oppositely aligned blade member 71 and the adjacent upstanding insulating wall portion 73 to make a positive mechanical and electrical connection between the contact means arm 68 and the electrical contact blade 71. It will now be appreciated that the recessed portions 64 and 63 of the insulating casing of the smaller modular sized circuit breaker of the present invention are required to afford clearance for the adjacent upstanding portions of the insulating block 72 as illustrated in FIGURE 7 and the adjacent electrical blade contact member such as 71 illustrated in FIGURE 7. As will be readily appreciated, the smaller modular size circuit breaker of the present invention is engageable between upstanding portions of an insulating block and an adjacent electrical blade contact member disposed in positions reversed from those shown in FIGURE 7, i.e., where the upstanding portion of the insulating block is on the right hand side and the electrical blade contact member is on the left hand side. In the latter case, of course, the lower resiliently spring biased contact arm portion of the contact means 67 provides the immediate electrical contact between an electrical contact blade deposed on that side.

Such an arrangement is shown in FIGURE 8 wherein a single pole smaller modular size circuit breaker unit 80 is shown in engagement with a portion of the panelboard load center of FIGURE 1 taken through section 8—8. Contrasted to the illustration of FIGURE 7, the left hand side of the contact means of the circuit breaker 80 is shown in engagement with the electrical contact blade member 16 and mechanically retained in that position by the upstanding portion 25 of the insulating block 20. An adjacent one-half module size circuit breaker 81 is shown positioned in electrical contact with the same panelboard electrical blade contact member 16, illustrating the manner in which two one-half module size circuit breakers may be engaged in connection with the same panelboard electrical blade contact member. A third one-half module size circuit breaker 82 is shown positioned and electrically engaged with the adjacent electrical contact blade member 17 substantially in the same manner which was shown in the partial view of FIGURE 7, the difference being that the circuit breaker 82 includes the electrical contact means as illustrated in FIGURES 3 and 4 rather than the circuit breaker contact means shown in FIGURES 5, 6 and 7. A full module size circuit breaker 83 is shown in electrical engagement and contact with the electrical contact blade member 19 and it is seen that its centrally disposed contact means, comprising opposed resilient contact jaws, slidingly engage the electrical blade contact member 19 therebetween, the circuit breaker 83 occupying one full module width on the panelboard load center. The casing of the breaker 83 is also recessed at opposite sides at 63A, 64A as shown in FIG. 8 to provide clearance for the barriers, see FIG. 9.

It will be noted that FIGURE 8 illustrates two one-half module size circuit breakers 80 and 81 engaged in electrical contact with a single electrical blade contact member 16 so that the two adjacent smaller modular size circuit breakers 80 and 81 are effectively single pole circuit breakers connected to the same electrical source and occupying one full module width space. In accordance with the concept of the present invention, however, the one-half module width circuit breakers may be combined into an assembly to be used and to function as a two pole circuit breaker within a one full module width space. In FIGURE 8 the circuit breakers 84 and 85 of one-half module width are shown in side-by-side relationship and are affixed to each other by suitable means such as the rivets 86 and 87 through their insulating casings. Their respective externally extending handle members 88 and 89 are also joined by a common handle tie 90 and the outer portions of their respective contact means 91 and 92 are shown in engagement and electrical contact with electrical blade contact members 14 and 15, respectively. The inner portions of their contact means being in engagement with the upstanding portion 24 of the insulating block 20. It will be recalled from FIGURE 1 that the electrical blade contact members 14 and 15 are electrically connected to and supported by the two bus bars 13 and 12, respectively. Accordingly, the two bus bars 12 and 13 may be connected to different sources of electrical energy so that adjacent electrical blade contact members 14 and 15 are supplied from two different phases of an electrical source, for instance. Thus it may be seen that a circuit breaker assembly comprising the two smaller modular size circuit breakers 84 and 85 function effectively as a two pole circuit breaker and may be connected into engagement with two different sources of electrical energy as illustrated in FIGURE 8, occupying one full modular width of space on the panelboard as conceived by the present invention.

Figure 9:
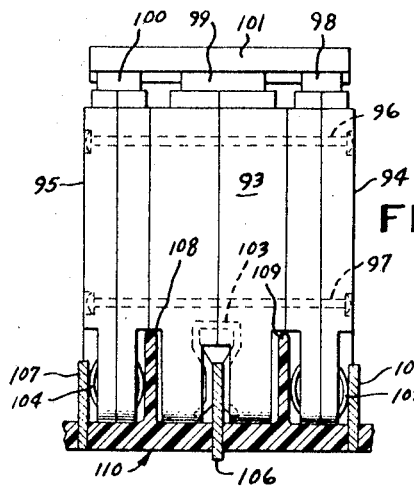
FIGURE 9 is a partially cross-sectional end view of a three pole circuit breaker assembly of the present invention comprising one full module size circuit breaker and two one-half module size circuit breakers.

A further aspect of the present invention is the arrangement by which one larger modular size circuit breaker and two smaller modular size circuit breakers may be combined into a three unit circuit breaker assembly to function as a three pole circuit breaker. FIGURE 9 illustrates a larger full modular size circuit breaker 93 joined in assembly with two smaller modular size circuit breakers 94 and 95 on either side by appropriate means which affix them together such as the rivets shown at 96 and 97. The externally extending reciprocally operable handle members 98, 99 and 100 are joined by a common handle tie 101. The electrical contact means 102 of circuit breaker 94 is shown in electrical engagement with the electrical contact blade member 105, while its resiliently supported opposite portion is shown bearing against the upstanding portion 109 of the insulating block 110. The larger modular size circuit breaker 93 is shown with its electrical contact means 103 comprising resiliently supported opposed contact jaws engaging electrical contact blade member 106 therebetween. The remaining circuit breaker 95 of the smaller modular size is shown with its electrical contact means 104 in electrical engagement with the electrical blade contact member 107 and its opposed resiliently supported portion in mechanical engagement with and bearing against the upstanding portion 108 of the insulating block 110. The upstanding portions 108 and 109 of the insulating block 110 are of course arranged in parallel disposition with respect to each other and also with respect to the adjacent electrical blade contact members 105, 106 and 107. Thus with the assembly as illustrated in FIGURE 9 in contact with a panelboard arrangement of contact members as illustrated, the adjacent electrical blade contact members 105, 106 and 107 may be energized by different sources of electrical energy such as three different phases, for instance. Accordingly, the circuit breaker assembly of FIGURE 9 which comprises three modularly related circuit breakers assembled into a combined unit will effectively operate as a three pole circuit breaker.

Those skilled in the art will appreciate the great number of possible combinations of such multipole circuit breakers which are afforded by the concept of the present invention including variant aggregate ampere rating, and discrete ampere ratings of each of the circuit breakers connected to different phases of an electrical source which may be readily accomplished by combining two one-half modular width circuit breakers with a single full module width circuit breaker.

Additionally, as illustrated in FIGURES 1 and 8, the left hand portion of the panelboard load center does not have the insulating block and its upstanding portions which are necessary to permit the engagement of one-half modular size circuit breakers with adjacent blade contacts such as blade contact member 18 on its left-hand side or the blade contact member 19 on either side, effectively segregating that portion of the panelboard and restricting its use to full module size circuit breakers.

While the invention has been illustrated in only one embodiment, it will be readily apparent that many modifications thereof may be made, and we therefore intend by the appended claims to cover all such modifications as fall within the true spirit and scope of the invention.

What I claim as new and desire to secure by Letters Patent of the United States is:

1. An electric circuit control device panel assembly comprising:
   (a) a generally planar supporting base;
   (b) a plurality of electrical contacts supported in insulated spaced relation on said base and each having generally planar contact surfaces on opposite sides thereof;
   (c) a plurality of rigid insulating barriers each positioned in juxtaposed relation to at least one of said contacts and having a generally planar side surface extending parallel to and spaced a short distance from one of said planar contact surfaces of said one contact;
   (d) a plurality of electrical control devices mounted on said base and each including a resilient spring means width-wise dimension substantially equal to one-half the spacing between the center lines of adjacent ones of said contacts, and wherein said control device panel assembly also comprises a plurality of second electric circuit control devices each having a width-wise dimension substantially equal to the spacing between said center lines of said adjacent contact blades, and second electric control devices each having a socket generally centrally thereof to receive one of said contacts and having portions at the outer sides thereof cut away to provide clearance for said insulating barriers.

5. An electric circuit control device panel assembly comprising:
   (a) a generally planar supporting base;
   (b) a plurality of electrical contacts supported in insulated spaced relation on said base and each having generally planar contact surfaces on opposite sides thereof;
   (c) a plurality of rigid insulating barriers each positioned in juxtaposed relation to at least one of said contacts and having a generally planar side surface extending parallel to and spaced a short distance from one of said planar contact surfaces of said one contact;
   (d) a plurality of electrical control devices mounted on said base and each including an insulating casing, a first movable member projecting from one side of said insulating casing adjacent one corner thereof and a second movable member projecting from said insulating casing at the opposite side thereof opposite said first member, and means resiliently biasing said first and second members apart; said resiliently biasing means, upon insertion of said control device between one of said insulating barriers and the adjacent contact blade, urging said first movable member into engagement with said barrier and urging second member into engagement with said planar contact surface of said contact, said second member comprising an electrical contact member contacting only one of said generally planar surfaces of said contact.

6. The combination of: a load center having bus blades of predetermined spacing; a plurality of circuit breakers of a thickness one-half the spacing between adjacent bus